March 10, 1936.  R. EDDY  2,033,189
VALVE MECHANISM
Filed Oct. 3, 1932  2 Sheets-Sheet 1
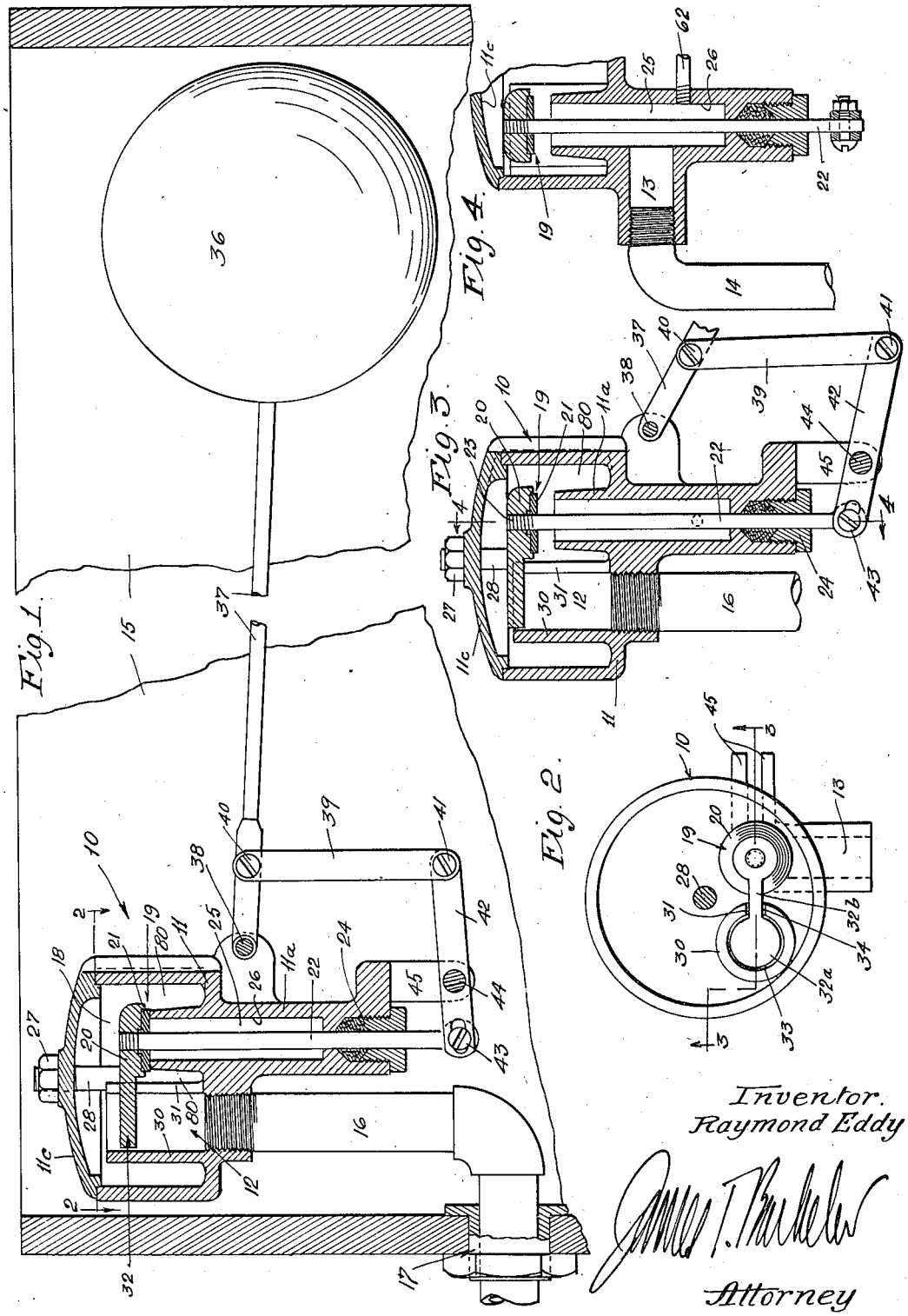
Inventor.
Raymond Eddy
Attorney March 10, 1936.    R. EDDY    2,033,189
VALVE MECHANISM
Filed Oct. 3, 1932    2 Sheets-Sheet 2
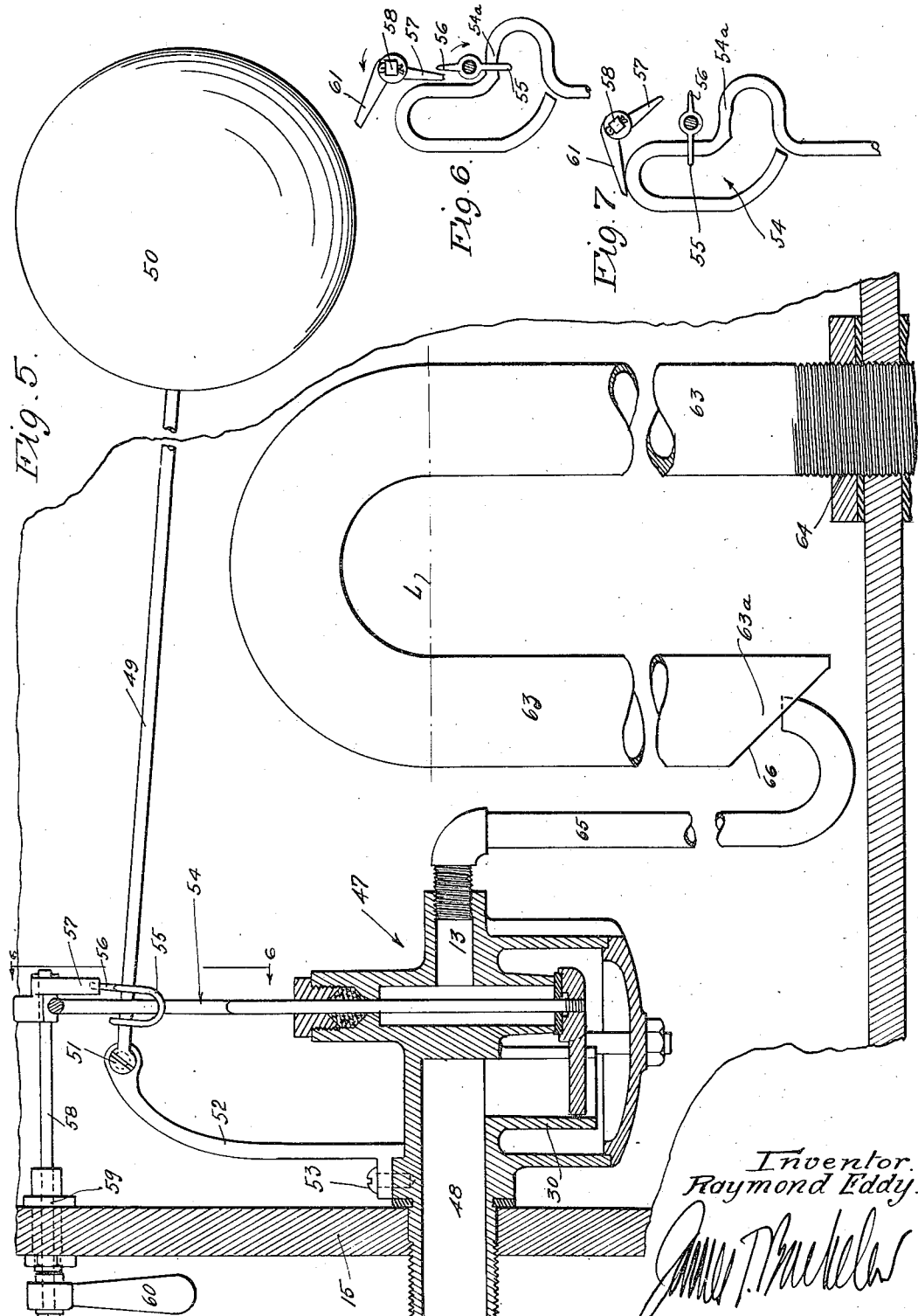

Patented Mar. 10, 1936

2,033,189

UNITED STATES PATENT OFFICE 2,033,189

VALVE MECHANISM

Raymond Eddy, Los Angeles, Calif.

Application October 3, 1932, Serial No. 635,969

7 Claims. (Cl. 137—111)

This invention relates in general to valve mechanisms, and is particularly concerned with improvements in such devices designed to eliminate fluid throttling noises, and to facilitate operation of the valve by compensating for pressure differentials thereon.

One of the principal objects of the invention is to provide a valve that is specially suited for installation where substantially noiseless operation is desired. As is commonly known, the operation of valves in lines carrying fluid substantial pressures, ordinarily is accomplished by distributing noises due to the throttling action of the valve on the fluid flowing past it. In accordance with the invention, I have been able to overcome such throttling noises to the extent that for all practical purposes, the valve is substantially noiseless in operation.

Except in the case of specially designed or balanced valves, high line pressures ordinarily cause the valve to require considerable force for its operation by reason of the high differential pressures applied to the valve, this objectionable feature being additive to the above mentioned throttling action had by the valve on high pressure fluid. By means of a simple connection with the valve, I have been able to render the valve capable of operation with comparative ease, and through this same connection, have substantially eliminated all throttling noises.

It is to be understood that the invention is applicable to a wide variety of valves, and that although I have selected one type of valve as representative of a typical embodiment of the invention, such showing is not to be construed as an implied limitation of the invention to the particular form or character of valve illustrated. For the reason that the disadvantages which the invention seeks to overcome are particularly prevalent in flush valves, the invention is hereinafter as embodied in this type of valve. While, broadly speaking, the present showing is typical only, the invention may be regarded as having its preferred embodiment in flush valves.

The above mentioned objects of the invention, as well as additional features and aspects thereof, will be understood to best advantage from the following detailed description. Throughout the description, reference is had to the accompanying drawings, in which:

Fig. 1 is a sectional view showing a flush tank valve embodying the invention, a fragmentary portion only of the flush tank being shown;

Fig. 2 is a plan section on line 2—2 of Fig. 1;

Fig. 3 is a fragmentary view illustrating the valve in changed position;

Fig. 4 is a fragmentary section on line 4—4 of Fig. 3;

Fig. 5 is a view generally similar to Fig. 1, but illustrating a variational form of the invention;

Fig. 6 is a fragmentary view taken as indicated by line 6—6 of Fig. 5, and showing the valve lock and release mechanism, and Fig. 7 is a view similar to Fig. 6, but showing the parts in changed positions.

Referring first to Fig. 1, the flow control valve device, generally indicated at 10, is shown to comprise a body 11 having an inlet 12 and a laterally opening outlet 13, see Fig. 4. The outlet connects with a pipe 14 leading downwardly to the bottom of the flush tank 15. The inlet 12 is connected with a water supply pipe 16 extending at 17 through the wall of the tank. The upper portion of the body is closed by cap 11c held in place by nut 27 threaded on a stud 28 which terminates in the lower portion of the body.

The flow of water from the inlet 12 through the valve chamber to outlet 13, is controlled by a valve, generally indicated at 19, comprising a head 20 carrying a rubber or leather washer 21 seating on the upper end of a tubular portion 11a of the body, which projects up into the valve chamber, as illustrated. The valve stem 22 is threaded at 23 into the head 20, and extends through a packing gland 24 in the lower end of the tubular portion 11a of the body. Sufficient clearance is provided at 25 between the valve stem and the wall of bore 26, to permit free discharge of liquid from the valve chamber to the outlet.

A tubular wall 30, which may conveniently be cast integrally with the body, forms a continuation of the inlet within the valve chamber 18. This interior extension 30 of the inlet is open at its upper end and has, at the side adjacent the valve bore 26, an elongated slot 31 extending in the direction of valve movement. Formed integrally with the valve head 20 is an arm, generally indicated at 32, extending laterally through slot 31 into the inlet, arm 32 consisting of a circular portion 32a having clearance from the wall of tube 30 as at 33, see Fig. 2, and a reduced size portion 32b extending through the slot 31 with slight clearance at 34 from the sides thereof. Preferably, the cross sectional area of the inlet will be greater than that of the effective outlet area, that is, the cross sectional area of the outlet space at 25; also the area of the liquid passing opening formed by slot 31 beneath the arm 32, will be greater than the sectional area of the space 25.

As will hereinafter appear, the arm 32 serves two functions effecting the operation of the valve. First, the arm, by virtue of its valve action within the inlet, has a tendency to so reduce the rate of flow into the valve chamber during closing movement of the valve 19, as to result in the elimination of throttling noises which usually accompany closing of the valve in devices of this character. Second, the effective pressure conditions upon the valve established by extending the arm 32 into the inlet, are such as to compensate the high pressure differentials on the valve to the extent that the latter may be opened with minimum force required. The valve action and the functions of the arm 32, however, will appear more fully hereinafter in the description of the entire flush valve mechanism.

Operation of the valve is controlled by means of float 36 carried on an arm 37 pivotally attached to the valve body at 38. In order to facilitate opening of the valve against the line pressure in the valve chamber, arm 37 is connected to the valve stem 22, by a linkage which gives to the float arm increased leverage. This linkage comprises link 39 pivotally connected at 40 to arm 37, and at 41 to a lever 42, the latter having a pin and slot connection at 43 with the valve stem, and being pivotally fulcrumed at 44 on the spaced depending body lugs 45. The flush tank 15 may be provided with any suitable form of outlet valve, not shown, which may be manually operated to release water from the tank to the bowl.

In operation, upon opening of the tank outlet valve, the water level in the tank falls, causing the float 36 to lower. Downward pivotal movement of the float arm 37 is communicated through link 39 and lever 42 to the valve, causing the latter to lift from its seat on the upper end of the tubular outlet portion 11a of the body. As soon as the valve is but slightly raised off its seat, an immediate flow of water starts from the inlet 12 into the bore 25 to set up a comparatively low, but effective, velocity head. Upon opening, even to a slight extent, of the valve 19, a rush of inlet water is directed upwardly against arm 32, tending to further open the valve and to counterbalance the forces resisting its opening movement. As a result of the velocity head so directed against arm 32, after the valve has once been raised from its seat, but little force is required to continue movement of the valve to full open position.

During the period in which the tank 15 is emptying, water is being continuously discharged into the tank through pipe 14, although the rate at which the water flows through the tank outlet greatly exceeds the rate at which it is supplied through the float controlled valve. As soon as the tank outlet valve seats, the water level in the tank rises, as does the float 36. Upward movement of the float arm results in the valve 19 being gradually moved from the open position of Fig. 3, to the closed position of Fig. 1. Ordinarily, in flush valve operation, this interval of closing movement of the valve is accompanied by the characteristic noises produced by the throttling action of the valve on the high velocity stream of water flowing past it. In the operation of the present valve device, these noises are substantially eliminated by virtue of the action of arm 32, in that as the valve closes, the arm, in moving downward, decreases the effective area of slot 31 to the extent that a throttling, though noiseless, effect occurs within the inlet. This is accompanied by a reduction of the throttling effect produced by the valve 19, to the extent that throughout the complete range of closing movement of the valve, the usual throttling noises are substantially eliminated.

An additional feature in reducing and eliminating throttle noises is the relative positions of opening 31, tubular portion 11a of the body and the annular water containing chamber 80 surrounding body portion 11a. It will be observed that the upper end of portion 11a extends a substantial distance above the lower edge of opening 31, and that, by virtue of this construction, a body of water is trapped within the annular chamber 80. It follows then that upon the opening of valve 20, the major portion of water flowing from opening 31 to the outlet passage 25, will pass through the space at the outside of body portion 11a and in contact with the water trapped in chamber 80. The result is that throttling noises that would normally occur at opening 31 are reduced by reason of the water passing through that opening being discharged into a body of water in the chamber 80. The body of water contained in the latter thus serves as a muffler for throttling noises resulting from a wire drawing effect at the inlet opening.

As previously mentioned, the effective area of slot 31 preferably is greater than the cross section area of the annular space 25, so that at open positions of the valve, the pressure differential between the valve chamber and the outlet is substantially greater than that between the inlet 12 and the valve chamber. In fact, there will be but comparatively small differential in the pressures within chamber 18 and the inlet 12, and such pressure differentials as applied to the upper and lower surfaces of the arm 32, will not be of such magnitude as to offer appreciable resistance to closing of the valve. Just as there is a velocity head of inlet water directed against the pressure compensating arm during opening movement of the valve to aid in such movement, there is likewise a velocity head against the arm to be overcome during closing movement of the valve. This, however, is in no way objectionable, since the force required to close the valve is in no wise excessive, and in fact the presence of a force, that is the velocity head, resisting to some extent, the downward movement of the valve and arm assembly is desirable for the reason that the valve is thus prevented from suddenly closing to set up a water hammer in the line. Also, by maintaining some resistance to closing of the valve, the latter is prevented from vibrating so as to create noises and set up pressure pulsations in the line.

During the time the valve is open, a comparatively small amount of water is discharged to the bowl, not shown, through a bypass 62, see Fig. 4, connecting with passage 25 and leading to the bowl. The function of the bypass 62 is similar to that of the usual bypass provided in flush tank valves, for supplying the after flow to the bowl.

In Fig. 5, I show a variational form of flush valve mechanism embodying the invention, and differing essentially from the previously described form, in being adapted to operate without the necessity for a separate valve to control the discharge of water from the flush tank. The float controlled valve, generally indicated at 47, is similar to that previously described except that, in order to adapt it to the type of installation shown in Fig. 5, the inlet 48 is shown to lead laterally into the passage extending through the interior slotted wall 30. For convenience in illustration, the outlet 13 is shown to lie in the same plane as the inlet. The valve body is here shown to be in inverted position, supported via the inlet 48 from the wall and flush tank. As before, the valve is operated by an arm 49 connecting with float 50, although in addition to a mere operating connection between the valve and float arm, I here show a mechanism for releasably locking with respect to the float arm the valve in closed position, and means for releasing the valve locking means and for moving the valve to open position.

Float arm 49 is pivotally connected at 51 to an arm 52 attached at 53 to the valve body. As shown in Figs. 6 and 7, the upper end of the valve stem is formed as a loop 54, having the shape indicated. The float arm 49 carries a U-shaped valve locking element 55, the latter being pivotally carried on the arm so as to be free to swing laterally thereon, and extending within the looped portion 54 of the valve stem. The locking element 55 carries a projection 56 adapted to be engaged by an arm 57 on a shaft 58, the latter being journalled at 59 in the wall of the tank and carrying handle 60. Shaft 58 also carries an arm 61 adapted to be brought into engagement with the upper end of loop 54 to move the valve rod down and the valve to open position, as will presently appear.

The flush tank outlet consists of a siphon tube 63 extending through the bottom wall of the tank as at 64, the bend of the siphon tube extending above the normal liquid level L. Leading from the outlet 13 of the valve 47 is a pipe 65 which extends beneath the inlet end 63a of the siphon tube, as indicated, pipe 65 being so positioned as to direct a high velocity stream of water upwardly within the tube 63 to start the siphon action. Preferably the inlet end of the siphon tube is beveled as at 66, in order to eliminate noises that would otherwise occur, should the inlet end be cut horizontally, as the water level lowers to the point at which air is admitted to the siphon.

The flush valve mechanism, shown in Fig. 5, is particularly adapted for installation where the water or line pressure is high, and where, ordinarily, difficulty might be experienced as a result of the force transmitted from the float arm being to open the valve against the line pressure. In adapting the device to high pressure installation, I have provided manually operable means for opening the valve, and a releasable connection between the valve and float arm, whereby the valve may move independently of the float arm in one direction, and be moved by the float arm in an opposite direction.

Normally, the valve is closed, as shown in Fig. 5, and the U-shaped locking element 55 is swung beneath the horizontally extending portion 54a of the loop 54, to lock the valve in closed position against downward movement relative to the float arm. In order to operate the flush valve mechanism handle 60 is turned so as to rock shaft 58 in the direction of the arrow in Fig. 6 to bring arm 57 into engagement with the projection 56 on the locking element, and to cause the latter to be swung to the valve releasing position of Fig. 7. Immediately thereafter, arm 61 is brought into engagement with the upper end of the loop as shown in Fig. 7, to move the valve down into open position.

Upon opening of the valve, a stream of water is injected upwardly from pipe 65 into the siphon tube with such velocity as to start the siphon action. Thereafter, the tank drains via the siphon tube until the water level drops to the siphon tube inlet 63a, at which point the admission of air causes the siphon to break. While the valve is open, water is, of course, continuously discharged into the tank through pipe 65. After discontinuance of the siphon, the tank gradually fills with water to the normal level L.

During the described tank emptying operation, the float 50 and arm 49 fall with the water level, and the locking element 55 on the float arm is lowered to the point at which it swings down beneath portion 54a of the valve stem loop to the starting position of Fig. 6. The valve stem having thus become locked with the float arm, as the float rises the valve is gradually moved upwardly to closed position.

During the interval between the time at which air is first admitted to the siphon tube and the time at which discharge through the tube is entirely discontinued, there will be some flow, at a comparatively slow rate, into the bowl. The water flowing into the bowl during this time, while insufficient to maintain the toilet siphon, will be sufficient to provide the desired after flow.

I claim:

1. A flush valve device comprising, a body having an outlet and a tubular inlet extending into the interior of the body, a valve for controlling the discharge of fluid through said outlet, and a circular member connected to said valve and extending into said tubular inlet through an opening in the wall of the latter, there being a small annular clearance space between said member and the wall of said inlet.

2. A flush valve device comprising, a body having an outlet and a tubular inlet extending into the interior of the body, a valve for controlling the discharge of fluid through said outlet, said inlet having an elongated slot in its wall extending in the direction of valve movement, and a member connected to said valve and extending through said slot into said inlet.

3. A flush valve device comprising, a body having an outlet and a tubular inlet extending into the interior of the body, a valve for controlling the discharge of fluid through said outlet, said inlet having an elongated slot in its wall extending in the direction of valve movement, and a member connected to said valve and extending through said slot into said inlet, fluid being caused to flow from the inlet through a portion of said slot directly to the outlet, and said portion of the slot being greater in area than the fluid passing area of said outlet.

4. A flush valve device comprising, a body having an outlet and a tubular inlet extending into the interior of the body, a valve for controlling the discharge of fluid through said outlet, said inlet having an elongated slot in its wall extending in the direction of valve movement, and a member connected to said valve and extending through said slot into said inlet, said member having clearance from the wall of said inlet and having a reduced size portion extending through said slot.

5. A flush valve comprising, a body having an inlet and an outlet, a valve for controlling the discharge of fluid through said outlet, means for compensating pressure differentials on the valve, said means comprising a circular member connected to said valve and projecting into said inlet to a point spaced a substantial distance from the end thereof, and there being a small annular clearance space between said member and the wall of said inlet.

6. In a flush valve, a body having a hollow interior and a vertically extending tubular portion projecting into said interior and forming an outlet passage leading therefrom, there being a water chamber surrounding said tubular portion, a valve for controlling the flow through said outlet, an inlet comprising a wall defining an opening through which liquid passes into said chamber, the upper end of said tubular portion of the body extending a substantial distance above the lower edge of said opening so that water flowing from said opening to the outlet passes through said chamber, and a member attached to said valve and movable across said opening transversely of the path of liquid passing therethrough.

7. In a flush valve, a body having a hollow interior and a vertically extending tubular portion projecting into said interior and forming an outlet passage leading therefrom, there being a water chamber surrounding said tubular portion, a valve for controlling the flow through said outlet, an inlet comprising a wall defining an opening through which liquid passes into said chamber, the upper end of said tubular portion of the body extending a substantial distance above the lower edge of said opening so that water flowing from said opening to the outlet passes through said chamber, a member attached to said valve and movable across said opening transversely of the path of liquid passing therethrough, a valve operating rod extending longitudinally within said outlet passage, the end of said passage being closed and the valve rod extending through said closed end, and a main discharge port leading from the side of said passage.

RAYMOND EDDY.